A. ENGELSMANN.
APPARATUS FOR SHOWING KINEMATOGRAPHIC PICTURES.
APPLICATION FILED JAN. 7, 1910.
1,019,141.  Patented Mar. 5, 1912.
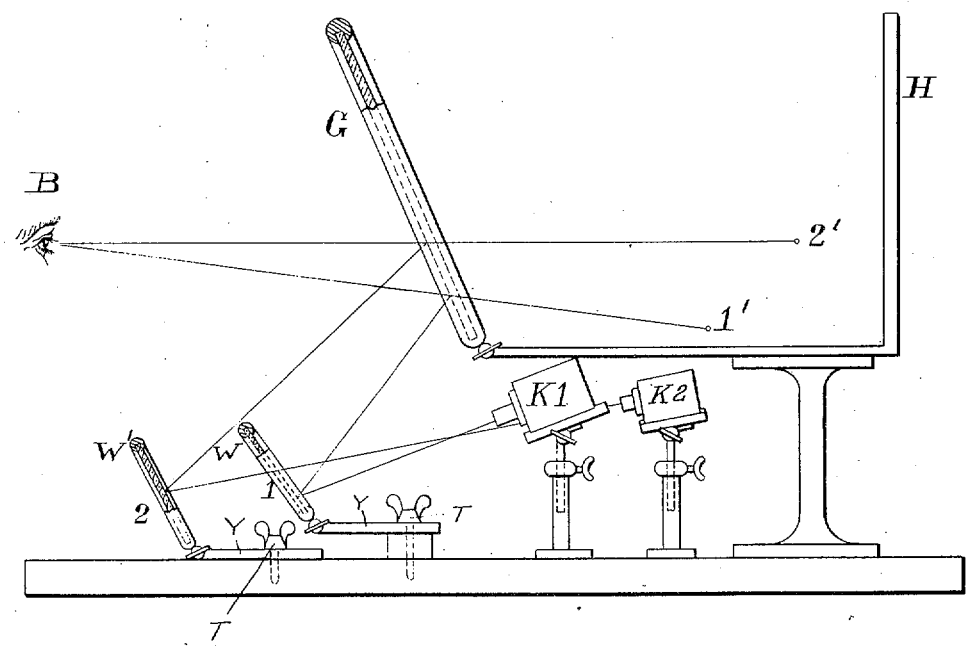
Witnesses
Inventor
August Engelsmann
Attorneys

UNITED STATES PATENT OFFICE.

AUGUST ENGELSMANN, OF CHARLOTTENBURG, GERMANY.

APPARATUS FOR SHOWING KINEMATOGRAPHIC PICTURES.

1,019,141.     Specification of Letters Patent.     Patented Mar. 5, 1912.

Application filed January 7, 1910. Serial No. 536,870.

*To all whom it may concern:*

Be it known that I, AUGUST ENGELSMANN, a subject of the German Emperor, and residing at Charlottenburg, near Berlin, Germany, have invented certain new and useful Improvements in Apparatus for Showing Kinematographic Pictures, of which the following is a specification.

My invention relates to apparatus for showing kinematographic pictures, and a primary object is to provide such apparatus comprising hidden, displaceable and adjustable reflecting surfaces onto which kinematographic pictures are projected in front of an adjustable slanting sheet of glass which serves simultaneously as a mirror in well-known manner and is arranged in front of a scenic background. The object of this arrangement is to enable the represented living pictures to appear in space, as it were, in front of the stationary scenic background with the aid of kinematographic films well-known in themselves which represent scenes without a background.

One illustrative embodiment of my invention is represented diagrammatically in elevation in the accompanying drawing.

Referring to the drawing, H denotes the scenic background which may be provided, similarly as in the case of stages, panoramas and the like, with plastic representations; G designates the transparent sheet of glass here shown as mounted in a frame and pivotally connected at its lower edge to the front of the stage H' and which can be slanted optionally and through which the spectator's eye B can see the background H.

W, W' designate suitable and reflecting, *e. g.* white surfaces pivoted at their lower edges, each to a slide Y adapted to move longitudinally, or rotate about adjustable fastenings T so that the reflected rays passing from said surfaces may be thrown on any portion of the glass sheet G to produce the required effect in the audience. The reflecting surfaces W, W' are shown in the drawing as mounted in frames and through their pivotal connections with the slides Y, Y, they can be slanted at any desired angle. On the surface W, W' the moving pictures without a background are thrown by the kinematographic apparatuses $K_1$, $K_2$. These pictures are reflected by the sheet of glass G and appear to the spectator to be more or less in space back from the sheet of glass, the point 1 on surface W appearing at 1' and the point 2 on surface W' appearing at 2'.

I claim:—

1. Combined with a stage having a background, an adjustable transparent sheet pivotally connected at its lower edge at the front of said stage, a reflecting surface below said stage and in front of said transparent sheet pivotally mounted to be moved about a horizontal axis and a vertical axis, and also to be moved horizontally in a straight line, and a kinematograph adjustably mounted to project pictures on said reflecting surface from whence they are reflected to the transparent sheet and thence to an audience, whereby said reflected pictures appear in space behind the transparent sheet and before said background, which latter therefore forms a portion of the scene, and where, owing to the adjustability of the reflecting surfaces, the apparent positions of the reflected images with relation to the background may be changed.

2. Combined with a stage having a background, a transparent sheet of glass adjustably mounted at its lower edge at the front of said stage, a plurality of independent reflecting surfaces, each reflecting surface being pivoted at its lower edge on a horizontally movable slide adapted to be turned on a vertical axis, and a plurality of kinematographs below said stage between the background and the reflecting surfaces, each kinematograph adapted to project pictures on one of said reflecting surfaces and from thence to the glass plate where said pictures appear to the audience in space between said plate or sheet and the background, each kinematograph and its accompanying reflecting surface being independently adjustable and so arranged that pictures produced by one kinematograph can be made to appear in space independently of the pictures produced by the other kinematograph, and to advance, recede, and pass one another.

In testimony whereof, I affix my signature in the presence of two witnesses.

AUGUST ENGELSMANN.

Witnesses:
 WOLDEMAR HAUPT,
 EDWARD J. BETTS.